May 3, 1960      G. A. LYON      2,935,358
WHEEL COVER
Filed July 1, 1955
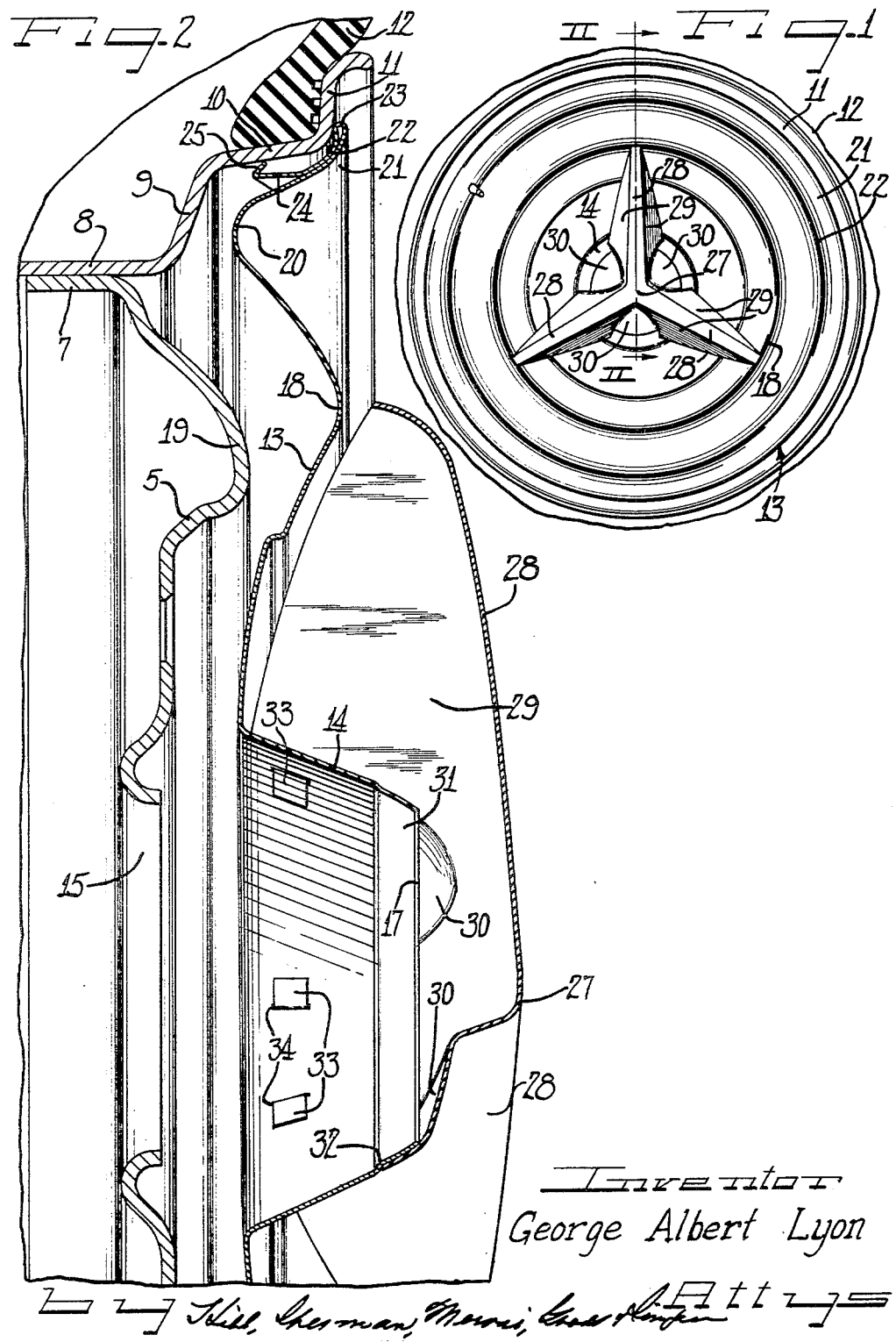
Inventor
George Albert Lyon United States Patent Office 2,935,358
Patented May 3, 1960

---

2,935,358

WHEEL COVER

George Albert Lyon, Detroit, Mich.

Application July 1, 1955, Serial No. 519,341

7 Claims. (Cl. 301—37)

---

The present invention relates to improvements in wheel structures and more particularly concerns the ornamental and protective covering of the outer sides of vehicle wheels.

An important object of the present invention is to provide an improved wheel structure having at the outer side thereof a novel ornamental and protective cover.

Another object of the invention is to provide an improved wheel cover for disposition at the outer side of a wheel affording the appearance of a knock-off wheel.

A further object of the invention is to provide an improved wheel cover having novel ornamental means applied at the center of the cover.

Still another object of the invention is to provide an improved cover assembly having simple and inexpensive knock-off type central ornamental means affording a substantially sport car wheel appearance.

Other objects, features and advantages of the present invention will be readily apparent from the following detailed description of a preferred embodiment thereof taken in conjunction with the accompanying drawings, in which:

Figure 1 is an outer side elevational view of a vehicle wheel structure embodying features of the invention.

Figure 2 is an enlarged fragmentary diametrical sectional view taken substantially on the line II—II of Fig. 1.

A wheel cover as shown in Figs. 1 and 2 is adapted to be applied to the outer side of a vehicle wheel including a disk spider wheel body 5 provided at the radially outer margin thereof with an axially extending attachment flange 7 suitably secured to a base flange 8 of a tire rim of the drop center multi-flange type. Extending generally radially and axially outwardly from the outer side of the base flange is a side flange 9 that merges with an intermediate generally axially outwardly and radially outwardly sloping flange 10 at the outer side of which is a generally radially outwardly and then axially outwardly turned terminal flange 11.

A pneumatic tire 12 of the tubeless type may be carried by the tire rim but a pneumatic tire and tube assembly may be mounted on the rim if desired.

In the present instance the cover is shown as of the full disk type which is adapted to substantially entirely cover the outer side of the wheel. To this end, the cover includes a main circular body portion or member 13 which is preferably made from suitable sheet material such as stainless steel, brass, or other suitable alloy that is susceptible of shaping and finishing as desired. For example, the cover plate 13 may be stamped or drawn to shape substantially according to the method in my Patent No. 2,707,449, issued May 3, 1955, and then polished and plated or otherwise appropriately externally finished.

By preference, the cover plate 13 is shaped to generally simulate in a more or less idealized manner and decoratively the outer side of the wheel and has at the central portion thereof and axially outwardly projecting and radially outwardly facing crown portion 14 of a diameter to overlie a central bolt-on flange aperture 15 through which the hub structure of a vehicle axle is adapted to project when the wheel is applied to the axle. Thus, the hub that projects through the aperture 15 is accommodated within the substantial chamber defined by the central crown portion 14 of the wheel cover. If preferred, in order to facilitate drawing, or for other reasons, the axially outer extremity of the crown may be open to provide an aperture 17 coaxial with the hub clearing aperture 15 in the wheel body.

From the base end portion of the crown 14, the cover plate extends generally radially and axially outwardly in overlying relation to the wheel body and with a generally axially outwardly directed annular bulge portion 18 lying generally opposite an annular axially outwardly projecting intermediate nose bulge 19 of the wheel body. Radially outwardly from the bulge portion 18 is an annular axially inwardly dished portion 20 of the cover plate adapted to lie opposite the side flange 9 of the tire rim and to extend into the outwardly opening annular channel defined between the outer side of the tire rim and the wheel body nose bulge 19.

At the radially outer side of the dished portion 20 is a generally radially and axially outwardly turned outer marginal portion 21 of the cover having an underturned flange 22 providing at the outer extremity of the cover a turned reinforcing and finishing bead edge 23 adapted to engage the outer side of the inner portion of the terminal flange 11 of the tire rim in assembly. The flange 22 preferably has thereon means for retaining the cover on the wheel, in the present instance comprising generally axially inwardly extending retaining finger extensions 24 provided with short and stiff generally radially and axially outwardly oblique retaining terminals 25 engageable in press-on, pry-off retaining gripping relation with the inner face of the intermediate flange 10 of the tire rim. Such a retaining finger arrangement is covered in my issued Patent 2,624,634, dated January 6, 1953.

As a central reinforcing and ornamental structure, the cover includes a cap shell member 27 which is carried in the cover assembly and as a unitary part of the cover by the central crown portion 14 of the cover plate 13. In the present instance, the member 27 is preferably in the form of a spoked or lobed construction generally simulative of a "knock-off" type handle such as is used on sport car wheels for quick removal of a wheel. To this end, the member 27 is herein shown as having a plurality of radially outwardly radiating and axially and radially inwardly opening hollow spoke-like arms or extensions 28 extending from a center to overlie the cover plate 13 to the bulge portion 18 thereof.

Herein there are three of the radiating spoke extensions 28, but it will be appreciated that there may be a less number or a greater number as preferred. For example, there may be two of the spoke extensions diametrically oppositely directed. On the other hand, there may be four or five of the spoke extensions 28 equally spaced instead of the three shown.

Each of the spoke extensions 28 has a generally radially outwardly extending crest that is turned generally axially inwardly at its outer end. From the opposite sides of the crest of the rib extension in each instance extends a pair of divergently related wing-like side wall panels or flanges 29. Adjacent the center of the member 27, the side wall panels 29 are connected together by dished, symmetrical, generally segmentally dome shaped reinforcing and stiffening gusset-like generally axially inwardly extending and radially inwardly facing portions 30. These portions 30 cooperate to provide a central dome or cap of preferably substantially less width than the radially inner portions of the arm side wall flanges 29 and adapted to cooperate telescopically in centering, supported relation with the central crown portion 14 of the wheel cover member 13.

For cooperation with the cap portions 30, the axially outer end section of the crown portion 14 is preferably provided with an annular seating flange 31 complementary in cross sectional shape to the inner margins defining the cap portions 30 and upon which such cap portions seat in centered relation. Positive axial placement of the member 27 relative to the crown portion 14 is attained as by means of an inset annular shoulder 32 at the juncture of the flange portion 31 with the body of the crown portion 14 receptive in assembly of the inner edges of the cap portions 30. Preferably the arrangement is such that the axially inner portion of the crown portion 14 beyond the shoulder 32 will lie flush with the inner margins of the cap portions 30 in assembly.

At their radially inner end portions adjacent juncture with the cap shell portions 30, the side walls 29 of the arms 28 have radially inwardly directed edges extending axially inwardly beyond the axially inner edges of the cap shell portions 30. Such radially inwardly directed edges of the walls 29 are preferably conformed or complementary to the outer side wall of the crown portion 14 axially inwardly beyond the shoulder 32, so as to abut the crown portion. Preferably the axially facing edges of the wing or wall flanges 29 radially outwardly from the crown engaging radially inwardly directed edges are spaced in assembly from the underlying cover member body as best seen in Fig. 2, thereby affording a reasonable range of relative movement in the gap thus afforded so that axially inward pressure against the outer arm member 27 will enable axially inward flexing of the cover member without imposing any strains upon the arms 28. At the same time, of course, the support afforded by the crown portion 14 for the arm member 27 by the various contacts with the crown portion not only through the cap portions 30 but also through the radially inwardly facing edge portions of the arm side walls 29 assures that the arms will be effectively supported against accidental deformation by axially inward forces thereagainst. Transverse deformation of the arms 28 is highly resisted not only by the reinforced rib construction thereof, but also by the triangular gusset-like cap portions 30 and the generally transversely and planar triangular structure and relationship of the side wall portions 29 of the arms.

Means for connecting the arm member 27 to the cover body may comprise attachment tabs or lug flanges 33 extending inwardly from the radially inwardly facing edge portions of the side walls 29 of the arms, and extending in retaining engagement through appropriate slots 34 provided therefor in the side of the radially outwardly facing crown portion 14. The tabs 33 are bent or clenched over onto the inner side of the crown portion 14.

It will be understood that modifications and variations may be effected without departing from the scope of the novel concepts of the present invention.

I claim as my invention:

1. In a cover for disposition at the outer side of a vehicle wheel, a cover plate having a central generally axially outwardly projecting crown portion with an inset annular shoulder thereon, and an arm member having central flange structure providing a cap-like portion thereon seated on said inset shoulder and said arms on the member projecting generally radially outwardly beyond said flange structure and shoulder, said arms having side flanges provided with edges engaging the side of the crown portion axially inwardly beyond said shoulder.

2. In a cover for disposition at the outer side of a vehicle wheel, a cover plate having a central generally axially outwardly projecting crown portion with an inset annular shoulder thereon, and an arm member having central flange structure providing a cap-like portion thereon seated on said inset shoulder and said arms on the member projecting generally radially outwardly beyond said flange structure and shoulder, said arms having side flanges provided with edges engaging the side of the crown portion axially inwardly beyond said shoulder, said side wall portions having tabs thereon interlocked with said crown portion.

3. In a cover structure for disposition at the outer side of a vehicle wheel, a central arm member for assembly with a cover plate, said arm member including a plurality of generally radially extending arms radiating from a center juncture and having side walls extending longitudinally generally radially and transversely generally axially inwardly and being connected at their radially inner ends by generally triangular gusset-like reinforcing portions cooperating to define a cap structure by which the member is adapted to be applied in assembly with a portion of a cover plate.

4. In a cover structure for disposition at the outer side of a vehicle wheel, a central arm member for assembly with a cover plate, said arm member including a plurality of generally radially extending arms radiating from a center juncture and having side walls extending longitudinally generally radially and transversely generally axially inwardly and being connected at their radially inner ends by generally triangular gusset-like reinforcing portions cooperating to define a cap structure by which the member is adapted to be applied in assembly with a portion of a cover plate, said arm side walls having radially inner portions that project axially inwardly beyond the gusset-like portions for engageable opposition to said portion of the cover plate.

5. In a wheel structure including tire rim and wheel body portions, a wheel cover assembly for disposition over the outer side of the wheel, including a cover plate having means thereon for retaining engagement with the wheel, a central portion of the cover plate having generally radially facing flange structure providing circumferentially disposed areas, a central cover member comprising a shell having a plurality of generally radially extending arms open axially inwardly and radially inwardly and provided with side walls connected at the respective adjacent radially inner ends thereof by angularly disposed segmental intermediate wall panels defining together a generally cap-like central section of the central cover member from which the arms project, said segmental panels being disposed relative to one another and to said cover plate central flange structure areas to engage such areas in face-to-face relation, said arms projecting substantially radially beyond the face-to-face engagement, and means on said cover plate and central cover member concealed behind the central cover member for securing the plate and member together with the central cover member maintained in centered relation to the cover plate by the engagement of said segmental panels and said flange areas.

6. A cover for disposition over the outer side of a wheel including tire rim and wheel body portions, a cover plate having means thereon for retaining engagement with a wheel, a central portion of the cover plate having generally radially facing flange structure providing circumferentially disposed areas, a central cover member comprising a shell having a plurality of generally radially extending arms open axially inwardly and radially inwardly and provided with side walls connected at the respective adjacent radially inner ends thereof by angularly disposed segmental intermediate wall panels defining together a generally cap-like central section of the central cover member from which the arms project, said segmental panels being disposed relative to one another and to said cover plate central flange structure areas to engage such areas in face-to-face relation, said arms projecting substantially radially beyond the face-to-face engagement, and means on said cover plate and central cover member concealed behind the central cover member for securing the plate and member together with the central cover member maintained in centered relation to the cover plate by the engagement of said segmental panels and said flange areas.

7. In a wheel structure including a member having a generally axially outwardly projecting and radially outwardly facing portion, a cover cap comprising a hollow axially inwardly opening shell provided with generally axially inwardly extending and radially inwardly facing portions telescopically disposed about said radially outwardly facing portion and interrupted by a plurality of radially outwardly extending axially and radially inwardly opening hollow arms having side walls joining said radially inwardly facing shell portions at radially inner end portions of the arms and provided at said radially inner end portions adjacent juncture with said radially inwardly facing shell portions with attachment means retainingly engaging said radially outwardly facing portion and thereby retaining said cap in assembly therewith.

References Cited in the file of this patent

UNITED STATES PATENTS

| | | |
|---|---|---|
| 978,516 | Turner | Dec. 13, 1910 |
| 1,256,788 | Greist | Feb. 19, 1918 |
| 2,022,128 | Lyon | Nov. 26, 1935 |
| 2,147,661 | Lyon | Feb. 21, 1939 |
| 2,148,212 | Lyon | Feb. 21, 1939 |
| 2,276,405 | Lyon | Mar. 17, 1942 |
| 2,434,940 | Lyon | Jan. 27, 1948 |
| 2,435,045 | Lyon | Jan. 27, 1948 |

FOREIGN PATENTS

| | | |
|---|---|---|
| 415,681 | Great Britain | Aug. 30, 1934 |
| 436,258 | Great Britain | Oct. 8, 1935 |
| 342,227 | Italy | July 24, 1936 |